United States Patent
Berge et al.

(10) Patent No.: US 7,602,557 B2
(45) Date of Patent: Oct. 13, 2009

(54) VARIABLE-FOCUS LENS

(75) Inventors: Bruno Berge, Lyons (FR); Jérôme Peseux, Solaize (FR)

(73) Assignee: Varioptic S.A., Lyons (FR)

( * ) Notice: Subject to any disclaimer, the term of this patent is extended or adjusted under 35 U.S.C. 154(b) by 296 days.

(21) Appl. No.: 11/574,101

(22) PCT Filed: Aug. 26, 2005

(86) PCT No.: PCT/FR2005/050686

§ 371 (c)(1), (2), (4) Date: Feb. 22, 2007

(87) PCT Pub. No.: WO2006/027522

PCT Pub. Date: Mar. 16, 2006

(65) Prior Publication Data

US 2008/0030870 A1    Feb. 7, 2008

(30) Foreign Application Priority Data

Aug. 27, 2004 (FR) .................................. 04 51919

(51) Int. Cl.
*G02B 1/06*    (2006.01)
*G02B 3/12*    (2006.01)

(52) U.S. Cl. ........................ 359/666; 359/665
(58) Field of Classification Search ............... 359/665, 359/666
See application file for complete search history.

(56) References Cited

U.S. PATENT DOCUMENTS

2006/0245092 A1 * 11/2006 Kuiper et al. ............... 359/883

FOREIGN PATENT DOCUMENTS

| FR | 2 791 439 | 9/2000 |
| JP | 2002-169005 A | 6/2002 |
| WO | WO 03/069380 A1 | 8/2003 |
| WO | WO 2004/077125 A2 | 9/2004 |

* cited by examiner

*Primary Examiner*—William C Choi
(74) *Attorney, Agent, or Firm*—Osha • Liang LLP

(57) ABSTRACT

The invention relates to a variable-focus lens comprising two opposing walls (21, 22) which are orthogonal to the axis of the lens and which define a space containing an isolating liquid (31) on the first wall (22) and a conductive liquid (32) which covers the isolating liquid and which comes into contact with the second wall (21). The surface (24) of the first wall (22) has high wettability for the isolating liquid and low wettability for the conductive liquid, while the surface (23) of the second wall (21) has high wettability for the conductive liquid and low wettability for the isolating liquid.

4 Claims, 1 Drawing Sheet

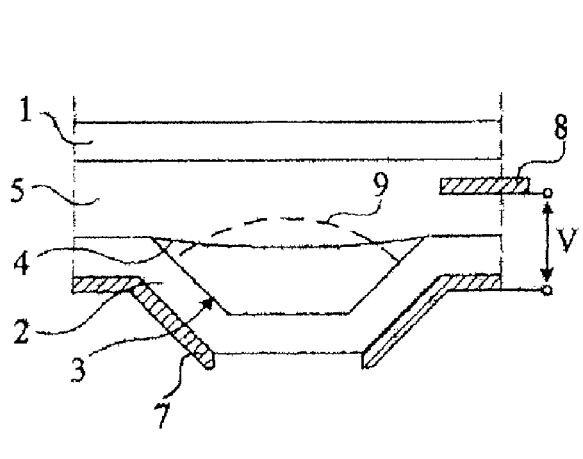
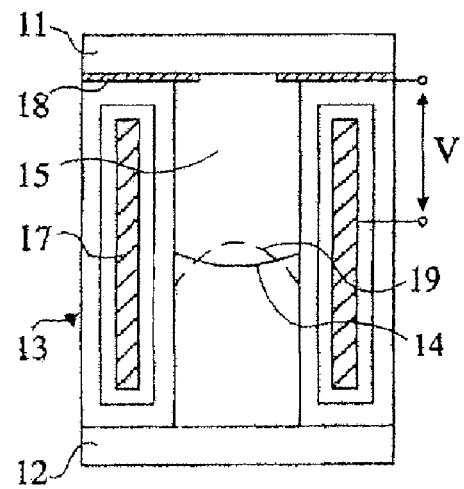
Fig. 1
(Prior art)
Fig 2
(Prior art)
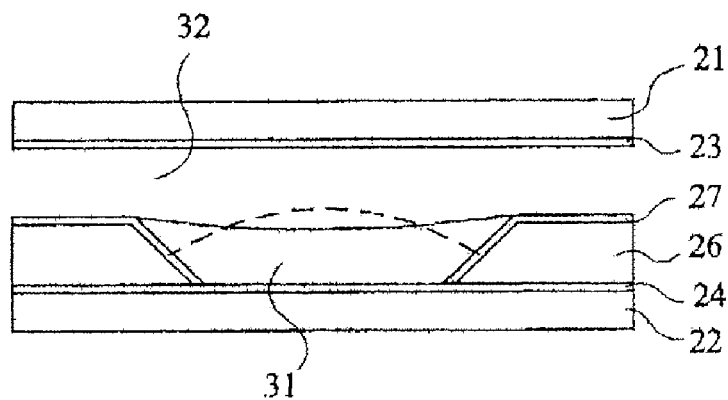
Fig 3
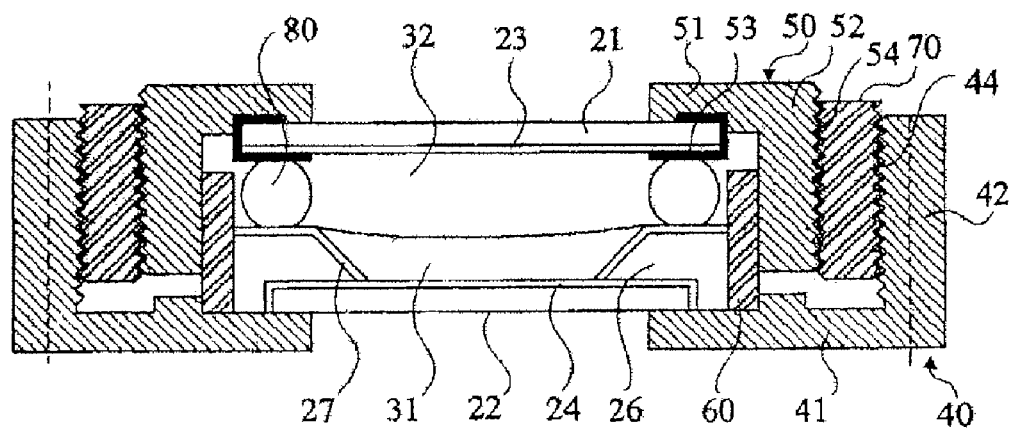
Fig 4

VARIABLE-FOCUS LENS

FIELD OF THE INVENTION

The present invention relates to variable-focus lenses and more particularly to such lenses employing the deformation of a drop of liquid by the phenomenon of electrowetting.

PRIOR ART

Various embodiments of variable-focus lenses are described in the Applicant's European patent 1166157. FIG. 1 of the present application substantially reproduces FIG. 12 of that patent. A cell is defined by two insulating plates 1 and 2 and sidewalls (not shown). The lower plate 2, which is not plane, includes an indentation or recess 3 that receives a drop of an insulating liquid 4. The rest of the cell is filled with an electrically conducting liquid 5, which is immiscible with the insulating liquid, has a different refractive index but substantially the same density. An annular electrode 7, open facing the recess, is placed on the rear face of the lower plate 2. Another electrode 8 is in contact with a conducting liquid 5. Through the phenomenon of electrowetting, it is possible, depending on the voltage V applied between the electrodes 7 and 8, to modify the curvature of the contact surface between the two liquids, which for example passes from the concave initial shape denoted by the reference 4 to the convex shape shown by the dotted line and denoted by the reference 9. Thus, a beam of light passing through the cell orthogonally to the plates 1 and 2 in the region of the drop 4 will be focused at a longer or shorter distance depending on the applied voltage.

Other embodiments of variable-focus lenses are described in document WO-A-03/069380. FIG. 2 of the present application substantially reproduces FIG. 1 of that document. A cell is defined by two insulating plates 11 and 12 and a cylindrical sidewall 13. The lower part 2 of the cell receives a drop 14 of an insulating liquid. The rest of the cell is filled with a conducting liquid 15, which is immiscible with the insulating liquid and has a different refractive index, but substantially the same density. The cylindrical sidewall 13 contains an annular electrode 17. Another electrode 18 formed on the internal face of the upper plate 11 is in contact with the conducting liquid 15. It is possible, depending on the voltage V applied between the electrodes 17 and 18, to modify the curvature of the contact surface between the two liquids, which for example passes from the concave initial shape denoted by the reference 14 to the convex shape, shown by the dotted line and denoted by the reference 19. Thus, a light beam passing through the cell orthogonally to the plates 11 and 12 in the region of the drop 14 will be focused at a longer or shorter distance depending on the applied voltage.

Although these solutions are satisfactory, they do have drawbacks in their implantation. This is because in practice the conducting liquid is generally an aqueous liquid and the drop, generally of an oily liquid, is positioned when the cell has been totally immersed beforehand in the aqueous liquid. The oily drop is injected via the bottom of the cell, but it may be difficult to expel the water from the bottom of the cell. The result may be that the drop is poorly positioned or that a drop of water is trapped beneath the drop of oil, introducing unacceptable optical perturbations.

Thus, it is necessary to take certain operating precautions in order to position the drop correctly, this drop being liable to divide and adhere partly to each of the plates 1 and 2 or 11 and 12. In the case of FIG. 1, the drop may also end up partly above the plane upper part of the lower plate 2.

These drawbacks also occur when the lens is used in an environment subject to shocks hence, under the effect of an acceleration, the drop may have a tendency to deform or be displaced, and to depart from the housing provided for this purpose. It may then be very tricky, if not impossible, to reposition it correctly.

SUMMARY OF THE INVENTION

One object of the present invention is to mitigate these drawbacks, so as to make it easier to carry out the drop implantation operations, and to prevent excessively large displacements of the liquids resulting in the drop being out of position or divided.

Another object of the present invention is to provide a particular variable-focus lens cell structure enabling its parameters to be optimized.

To achieve these objects, and others, the present invention provides a variable-focus lens comprising, in a space defined between two facing walls orthogonal to the axis of the lens, an insulating liquid on a first of the walls and, covering the insulating liquid and coming into contact with the second wall, a conducting liquid. The surface of the first wall has high wettability for the insulating liquid and low wettability for the conducting liquid and the surface of the second wall has high wettability for the conducting liquid and low wettability for the insulating liquid.

According to one embodiment of the present invention, the surface of at least one of the walls is coated with a layer giving it the desired wettability characteristics.

According to one embodiment of the present invention, the wettability of the surface of the first wall is such that the contact angle of a drop of the insulating liquid in the conducting liquid for this surface is less than 75°.

According to one embodiment of the present invention, the wettability of the surface of the second wall is such that the contact angle of a drop of the conducting liquid in the insulating liquid for this surface is less than 75°.

According to one embodiment of the present invention, the wall bearing the insulating liquid comprises a plate of insulating material coated with a material having high wettability for the insulating liquid and low wettability for the conducting liquid, a conducting plate with a central opening, in which the insulating liquid is placed, being deposited on said insulating plate, this conducting plate being coated, on the inside of the cell, with one or more materials suitable for providing insulation and having optimum wetting properties for the operation of the lens.

Another subject of the present invention is a variable-focus lens assembly comprising, between an upper transparent plate and a lower transparent plate, a pair of liquids having an interface, the profile of which can be modified by varying a voltage applied between one of the liquids, a conducting one, and an electrode close to the other liquid, the insulating one, this assembly including a first conducting ring, in electrical contact with the conducting liquid and bearing on the upper plate, and a second conducting ring, in electrical contact with said electrode and bearing on the lower plate, each of these rings having a cylindrical region, the opposed faces of these cylindrical regions being threaded, and a third ring, which is insulating, having internal and external threads, being interposed between said two cylindrical parts.

BRIEF DESCRIPTION OF THE DRAWINGS

The objects, features and advantages, together with others, of the present invention will be explained in detail in the following description of particular embodiments, given as nonlimiting examples, in relation to the appended figures in which:

FIGS. 1 and 2, described above, are sectional views of examples of variable-focus lenses according to the prior art, which illustrate problems that the invention seeks to solve;

FIG. 3 is a sectional view of one embodiment of a lens according to the invention; and FIG. 4 is a sectional view of an example of a lens assembly for the lens of FIG. 3.

DETAILED DESCRIPTION

FIG. 3 shows one embodiment of a variable-focus lens cell according to the present invention. The cell is bounded by two plates 21 and 22 made of transparent insulating materials, which are orthogonal to the optical axis of the lens. According to a fundamental aspect of the present invention, which also applies to cells of the types illustrated in FIGS. 1 and 2, these plates consist of, or are coated on their internal walls with, materials having specific wettability properties, namely the internal wall of the upper plate 21 that has to be in contact with the conducting liquid has high wettability for this conducting liquid and low wettability for the insulating liquid and the internal wall of the lower plate 22 that has to be in contact with the insulating liquid has wettability characteristics the reverse of the above.

In the standard case in which the conducting liquid is an aqueous liquid and the insulating liquid is an oily liquid, the material or coating of the upper plate will be highly hydrophilic, while that of the lower plate will be highly hydrophobic.

In FIG. 3, a hydrophilic coating has been denoted by the reference 23 and a hydrophobic coating by the reference 24.

In practice, various materials with hydrophilic properties may be used. Good results have been obtained using, as hydrophilic surface, a mineral glass or a silicon-oxide-coated polycarbonate.

Among hydrophobic materials, perfluoro-ethylene-propylene (FEP) and perfluoroalkoxy (PFA) may be especially mentioned. These materials, which are transparent, may constitute the wall itself. Other materials may also be used, but only as coating layer. Polymers such as soluble fluoropolymers may especially be mentioned, for example the products sold under the reference AF 1600 by DuPont de Nemours, or the products sold by Cytonix, or else layers of silanes grafted onto the surface of the materials, which give the latter desirable wettability properties.

In practice, the wettability of the surface of a wall is measured by the angle that the contact surface between the two fluids makes to the surface of the wall. The contact angle is defined as the angle between the contact surface between two fluids and the solid wall on which this contact surface bears. This angle depends only on the nature of the fluids in question and on the wall, and not the shape of the wall. If the two fluids are two immiscible liquids, identical wettability for the two liquids means that the contact surface is substantially perpendicular to the surface of the wall. If the surface of the wall exhibits greater wettability for one of these liquids, this means that the contact surface between the two liquids makes an acute angle on the side with the liquid in question.

Thus, a surface may be termed hydrophobic if the peripheral surface of the drop makes an obtuse angle to the surface of the wall on the drop side. Conversely, if this angle is an acute angle, the surface is considered to be hydrophilic. As a general rule, the wettability of a surface is measured although two different liquids are present, the interface surface between the two liquids forming the periphery of the drop.

Given below is a table summarizing the representative wettability contact angles of certain materials used as regards hydrophobic and hydrophilic surfaces, in combination with the liquid forming the characteristic drop and the surrounding fluid (gas or liquid). These tests were carried out using, as water, deionized ultrapure water, and, as oil, an oil sold by Exxon Mobil Chemical under the name ISOPAR V (CAS No. 64742-46-47). The glass used as hydrophilic surface was an optical glass, such as that denoted by the acronym BK7.

|  | Coating | Liquid drop | Surrounding liquid | Contact angle |
|---|---|---|---|---|
| Hydrophobic surface | AF1601 (DuPont) | Water | Air | 105° |
|  |  | Oil | Air | 57° |
|  |  | Oil | Water | <10° |
|  | 801-A (Cytonix) | Water | Air | 104° |
|  |  | Oil | Air | 65° |
|  |  | Oil | Water | 45° |
| Hydrophilic surface | Glass | Water | Air | <10° |

In practice, good results are obtained when the wettability of the surface 24 of the plate receiving the oil drop is such that the contact angle of the oil in the water is less than 75° and the wettability of the surface 23 of the plate in contact with the aqueous liquid is such that the contact angle of the water in the oil is less than 75°.

In the exemplary embodiment shown in FIG. 3, the lower part of the cell comprises the abovementioned insulating plate 22, the upper surface (or a coating) 24 of which has the desired wettability characteristics. A plate 26 of a conducting material coated with an insulating coating 27 is laid on, preferably bonded to the insulating plate. The insulating coating 27 may be a multilayer coating. Its external surface is such that its wettability characteristics are optimized for obtaining the desired meniscus shape at rest between the insulating liquid 31 and the conducting liquid 32. Thus, according to one advantage of this embodiment, the wettability properties of the coating of the upper part 24 of the insulating plate 22 can be dissociated from the wettability properties of the external face of the insulating coating 27. The properties of the layer 23 are mainly intended to optimize the adhesion of the drop to its support, and the properties of the layer 27 are mainly intended to optimize the characteristics of the electrowettability function.

FIG. 4 illustrates an example of an assembly of the various plates of the lens of FIG. 3. A first metal ring 40 has a lower part in the form of a plate 41 that supports the lower insulating and conducting plates 22, 26 and ensures that there is electrical conductivity with the conducting material of the plate 26, and a cylindrical peripheral part 42 that surrounds the structure and is provided with an internal thread 44. A second metal ring 50 has an upper part in the form of a plate 51, which bears on the upper insulating plate 21 and ensures that there is electrical contact with the conducting liquid 32, preferably via conductive coating 53 provided on the periphery of the plate 21. The second metal ring 50 thus has a cylindrical peripheral part 52 provided with an external thread 54. The cylindrical peripheral part 52 is internal to the cylindrical peripheral part 42. A first cylindrical insulating ring 60 is placed between the external periphery of the lens and the internal periphery of the second conducting ring 50. A second cylindrical insulating ring 70 is placed between the cylinders 42 and 52 and is provided with internal and external threads that are respectively intended for coupling with the external thread 54 of the cylinder 52 and the internal thread 44 of the cylinder 42. An O-ring seal 80 keeps the plate 26 separated from the plate 21. The height is also maintained by the length of the ring 60.

This structure is assembled in the following manner. The cell 21-27 is fitted with the seal 80, the oil 31 and the water 32 being in place. Next, the following are fitted in succession: the ring 40, the ring 70 screwed into this ring 40, the ring 60, and the ring 50 screwed into the ring 70 so as to clamp the seal 80 and to maintain sealing. The conducting rings 40 and 50 may be provided with threads or drillholes for the insertion of connection elements and/or for mounting the lens on the device to which it has to be fitted.

Of course, this merely shows one possible example of an assembly, and various alternative embodiments will be apparent to those skilled in the art. In particular, the various rings may be provided with locking shoulders. The seal 80 and the insulating ring 60 may be placed differently or even combined provided that the function of isolating the rings 40 and 50, the sealing function and the function of keeping the upper and lower plates of the lens spaced apart are ensured. In addition, this type of assembly may be suitable for variable-focus lenses other than that described in relation to FIG. 3.

As indicated above, the present invention also applies to the exemplary embodiments shown in FIGS. 1 and 2. In these embodiments, the materials of the plates 1 and 11, or of the internal coatings on these plates, will be such that the internal walls of these plates have strongly hydrophilic properties. In the case of FIG. 2, the material of the lower plate 12, or a coating on this plate, will have highly hydrophobic properties. In the case of FIG. 1, a highly hydrophobic coating will preferably be provided at the bottom of the recess 3, a coating optimized for the operation of the lens on the oblique walls of the recess, and a hydrophilic coating on the upper plane peripheral part of the plate 2, in order to prevent the oil drop from adhering thereto.

Moreover, FIGS. 1 and 3 show regions for positioning the insulating liquid that are in the form of a cup with plane sidewalls inclined at 45°. Various other shapes could be used, for example cylindrical or toric shapes.

It follows from the structure according to the present invention that the insulating drop will naturally tend to be positioned in the highly hydrophobic region of the bottom of the recess in the case of FIGS. 1 and 3, and of the lower plate 12 in the case of FIG. 2, and that, even if the drop accidentally comes into contact with another surface, such as the surface of the upper plate, it will not adhere to this surface and will naturally be repositioned on the lower face side.

To give an example, in the case of FIG. 3, the lower part of the opening in the plate 26 may have a diameter of 3 to 5 mm, this plate having a thickness of a few tenths of an mm, the distance between the plate 26 and the plate 21 also being a few tenths of an mm, and the upper and lower plates being glass plates with a thickness of the order of 1 mm.

The invention claimed is:

1. A variable-focus lens comprising:
   first and second transparent insulating plates (21, 22) placed facing each other orthogonally to the axis of the lens;
   in a space defined between said plates, an insulating liquid (31) on the first plate (22), and a conducting liquid (32) covering the insulating liquid and coming into contact with the second plate (21), the surface (24) of the first plate (22) having high wettability for the insulating liquid and low wettability for the conducting liquid, and the surface (23) of the second plate (21) having high wettability for the conducting liquid and low wettability for the insulating liquid; and
   a conducting plate (26) deposited on the first plate and provided with a central opening in which the insulating liquid is placed, the conducting plate being, on the inside of the cell, coated with an insulating coating (27), the wettability characteristics of which are optimized for obtaining the desired miniscus shape at rest between the insulating liquid and the conducting liquid.

2. The lens as claimed in claim 1, in which the surface of at least one of the walls is coated with a layer (23, 27) giving it the desired wettability characteristics.

3. The lens as claimed in claim 1, in which the wettability of the surface (24) of the first wall (22) is such that the contact angle of a drop of the insulating liquid in the conducting liquid for this surface is less than 75°.

4. The lens as claimed in claim 1, in which the wettability of the surface (23) of the second wall (1, 11, 21) is such that the contact angle of a drop of the conducting liquid in the insulating liquid for this surface is less than 75°.

* * * * *